US007445646B1

(12) United States Patent
Strange et al.

(10) Patent No.: US 7,445,646 B1
(45) Date of Patent: Nov. 4, 2008

(54) METHOD OF PRODUCING AN ANODE FOR AN ELECTROLYTIC CAPACITOR

(75) Inventors: Thomas F. Strange, Easley, SC (US); R. Jason Hemphill, Pickens, SC (US); Xiaofei Jiang, Liberty, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 258 days.

(21) Appl. No.: 10/912,936

(22) Filed: Aug. 6, 2004

(51) Int. Cl.
*H01G 9/045* (2006.01)
*H01G 9/048* (2006.01)

(52) U.S. Cl. .................... 29/25.03; 29/25.41; 29/896.6; 361/509; 428/613

(58) Field of Classification Search .................. None
See application file for complete search history.

(56) References Cited

U.S. PATENT DOCUMENTS

| | | | | | |
|---|---|---|---|---|---|
| 2,266,349 | A | * | 12/1941 | Bernhard | .................... 29/17.3 |
| 2,417,460 | A | * | 3/1947 | Eitel et al. | .................. 313/107 |
| 2,499,977 | A | * | 3/1950 | Scott | .......................... 148/527 |
| 2,619,438 | A | * | 11/1952 | Varian et al. | ................. 148/527 |
| 2,752,731 | A | * | 7/1956 | Altosaar | ........................ 65/23 |
| 2,900,579 | A | * | 8/1959 | Rogers | ...................... 361/509 |
| 3,087,233 | A | * | 4/1963 | Turnbull | ..................... 428/605 |
| 3,243,642 | A | * | 3/1966 | Gebel | .......................... 315/11 |
| 3,502,502 | A | * | 3/1970 | Elsby | .......................... 427/79 |
| 3,742,369 | A | * | 6/1973 | Douglass | .................... 361/529 |
| 3,751,271 | A | * | 8/1973 | Kimura et al. | ................. 501/85 |
| 3,887,365 | A | * | 6/1975 | Sherfey | .......................... 419/2 |
| 4,166,564 | A | * | 9/1979 | Wolber | ........................ 228/156 |
| 4,427,506 | A | | 1/1984 | Nguyen et al. | ............ 204/129.4 |
| 4,474,657 | A | | 10/1984 | Arora | ..................... 204/129.75 |
| 4,518,471 | A | | 5/1985 | Arora | ...................... 204/129.1 |
| 4,525,249 | A | | 6/1985 | Arora | ..................... 204/129.75 |
| 5,034,857 | A | * | 7/1991 | Wong | ........................ 361/509 |
| 5,131,388 | A | | 7/1992 | Pless et al. | ............. 128/419 D |
| 5,245,514 | A | * | 9/1993 | Fife et al. | .................... 361/529 |
| 5,564,067 | A | * | 10/1996 | Hendricks | ................... 428/566 |
| 5,715,133 | A | | 2/1998 | Harrington et al. | .......... 361/500 |
| 5,869,196 | A | * | 2/1999 | Wong et al. | ................. 428/613 |

FOREIGN PATENT DOCUMENTS

| | | | |
|---|---|---|---|
| JP | 58-164705 | * | 9/1983 |
| JP | 2002-339288 | * | 11/2002 |
| JP | 2003-147571 | * | 5/2003 |

* cited by examiner

*Primary Examiner*—John J Zimmerman
(74) *Attorney, Agent, or Firm*—Steven M. Mitchell

(57) ABSTRACT

A micro-denier fiber of less than approximately 2.0 microns is coated in a valve metal to a metal thickness of approximately 0.2 to 2.0 microns. In one embodiment, a long filament of coated fiber is wound on a spool in such a way that the maximum arrangement of fiber density is achieved For example, the spool may have a cross section exhibiting a hexagonal close-packed arrangement of the fibers. In another embodiment, a plurality of fibers may be grown or formed into a particular arrangement prior to coating. Once coated and arranged, the fiber mass is compressed and constrained so that shapes can be cut out in various thicknesses, such as, for example, approximately 50 microns to 5000 microns. Each sheet is sintered to bind the metal and remove the fiber, leaving a porous anode that can be oxidized and formed in the usual manner for a capacitor.

25 Claims, 9 Drawing Sheets

METHOD OF PRODUCING AN ANODE FOR AN ELECTROLYTIC CAPACITOR

BACKGROUND OF THE INVENTION

1. Field of the Invention

The present invention relates to anodes, specifically anodes used in an electrolytic capacitor and a method for producing such anodes.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator ("ICD"), also referred to as an implantable defibrillator or implantable cardiac device, since the high voltage capacitors used to deliver the defibrillation pulse can occupy as much as one third of the ICD volume.

ICDs, such as those disclosed in U.S. Pat. No. 5,131,388, incorporated herein by reference in its entirety, typically use two electrolytic capacitors in series to achieve the desired high voltage for shock delivery. For example, an ICD may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

Since these capacitors must typically store approximately 30 to 40 joules, their size can be relatively large, and it is difficult to package them in a small implantable device. Currently available ICDs are relatively large (over 36 cm$^3$), generally rectangular devices about 12 to 16 mm thick. A patient who has a device implanted may often be bothered by the presence of a large object in his or her pectoral region. Furthermore, the generally rectangular shape can in some instances lead to pocket erosion at the somewhat curved corners of the device. For the comfort of the patient, it is desirable to make smaller and more rounded ICDs. The size and configuration of the capacitors has been a major stumbling block in achieving this goal.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of an anode foil, for example, results in increased capacitance per unit volume of the electrolytic capacitor. By electrolytically etching the anode foil, an enlargement of a surface area of the foil will occur. Electrolytic capacitors which are manufactured with such etched foils can obtain a given capacity with a smaller volume than an electrolytic capacitor which utilizes a foil with an unetched surface.

In a conventional electrolytic etching process, surface area of the foil is increased by electrochemically removing portions of the foil to create etch tunnels. For example, U.S. Pat. Nos. 4,474,657, 4,518,471, and 4,525,249 to Arora disclose the etching of aluminum electrolytic capacitor foil by passing the foil through an electrolyte bath. The preferred bath contains 3% hydrochloric acid and 1% aluminum as aluminum chloride. The etching is carried out under a direct current ("DC") and at a temperature of 75° C. U.S. Pat. No. 4,474,657 is limited to the above single step. U.S. Pat. No. 4,518,471 adds a second step where the etched foil is treated in a similar bath with a lower current density and at a temperature of 80-82.5° C. U.S. Pat. No. 4,525,249 adds a different second step, where the etched foil is treated in a bath of 8% nitric acid and 2.6% aluminum as a nitrate, at a temperature of 85° C. Other examples of conventional etching techniques may be found in U.S. Pat. No. 5,715,133 to Harrington et al. and U.S. Pat. No. 4,427,506 to Nguyen et al.

The ideal structure for increasing surface area is a pure tunnel with defined and uniform tunnel diameters. As tunnel density (i.e., the number of tunnels per square centimeter) is increased, a corresponding enlargement of the overall surface area will occur. Larger surface area results in higher overall capacitance. However, traditional etching processes create tunnels of varying and unpredictable length that do not typically extend completely through the anode. These traditional processes also cannot create uniform parallel tunnels. What is needed is a system and method for making anodes having approximately parallel tunnels extending through the anode, increasing capacitance and thereby allowing reduction in overall anode size.

SUMMARY OF THE INVENTION

According to the present invention, a micro-denier fiber of less than approximately 2.0 μm can be used as a basis to create a highly porous high surface area anode. This fiber may be an organic and/or synthetic fiber, such as a polyester, polyacrylic, poly amide, polypropylene, or nylon fiber.

According to the present invention, the fiber is coated in a valve metal such as aluminum, titanium, niobium or tantalum. The fiber may be coated by sputtering, evaporation, physical vapor deposition, chemical vapor deposition, or other coating techniques known to a person of skill in the relevant art(s). In a preferred embodiment, thickness of the coating may, for example, range from 0.2 μm to 2.0 μm.

In one embodiment, multiple micro-denier fibers are grown and may be bundled together in a predetermined arrangement, such as a hexagonal close-packed arrangement. If the fibers are grown in the predetermined arrangement, the fibers are coated while in the arrangement. Otherwise, the fibers are individually coated prior to being assembled in the predetermined arrangement. Depending on the anode thickness desired, the fiber mass may be cut, or it may be left at the length to which it grew. The fiber mass is sintered to bind the metal and remove the fiber, leaving a porous high surface area anode that can be oxidized and formed in the usual manner for a capacitor. The final shape of this anode section can be any of a number of geometries, and may be, for example, in the form for a foil, slug, cylinder, or any geometry suitable for the construction. For example, the fibers may be formed into a porous slug having the desired dimensions of a finished capacitor.

In another embodiment, the coated fiber is wound on a large diameter core. The core may have a diameter of 0.1 to 1.0 m. As the coated fiber is wound, it is organized and collated in such a way that the maximum arrangement of fiber density is achieved. For example, the fiber may be wound so that its cross-section is a hexagonal close-packed arrangement of the fibers. Once wound to a suitable diameter, the fiber mass is then compressed, such as by cold-welding, so that the mass can be cut into an appropriate shape. For instance, if an anode foil is desired, the shape may be a sheet having a thickness of, for example, 50 µm to 1000 µm. The sheets are sintered to bind the metal and remove the fiber, leaving a sheet of porous foils that can be oxidized and formed in the usual manner for a capacitor. Alternatively, sintering may take place while the fiber mass is wound on a roll before being cut.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

In the present invention, one or more fibers are coated with a metal and arranged to form an array. The fibers are then removed from the array so as to form uniform tunnels through the remaining metal (see FIG. 5). The remaining metal can be cut into sheets for use as, for example and without limitation, a highly porous, high surface area anode. Because of the number of uniform tunnels the surface area of the anode is increased, which in turn increases the available capacitance carried by the anode. Although the example of a porous foil will be used throughout the description, one of skill in the relevant art will recognize that the final shape of the anode can be any of a number of geographies, including but not limited to a foil, slug, or cylinder.

Figure 1:
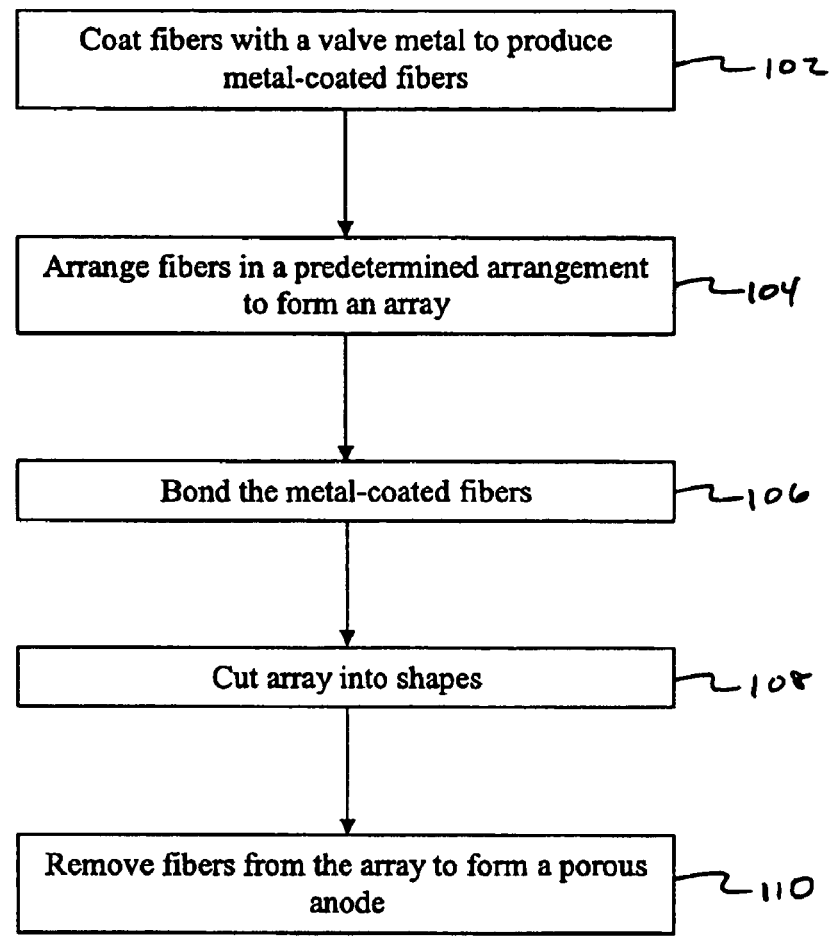
FIG. 1 is a flowchart of a method of producing an anode according to an embodiment of the present invention.
Figure 2:
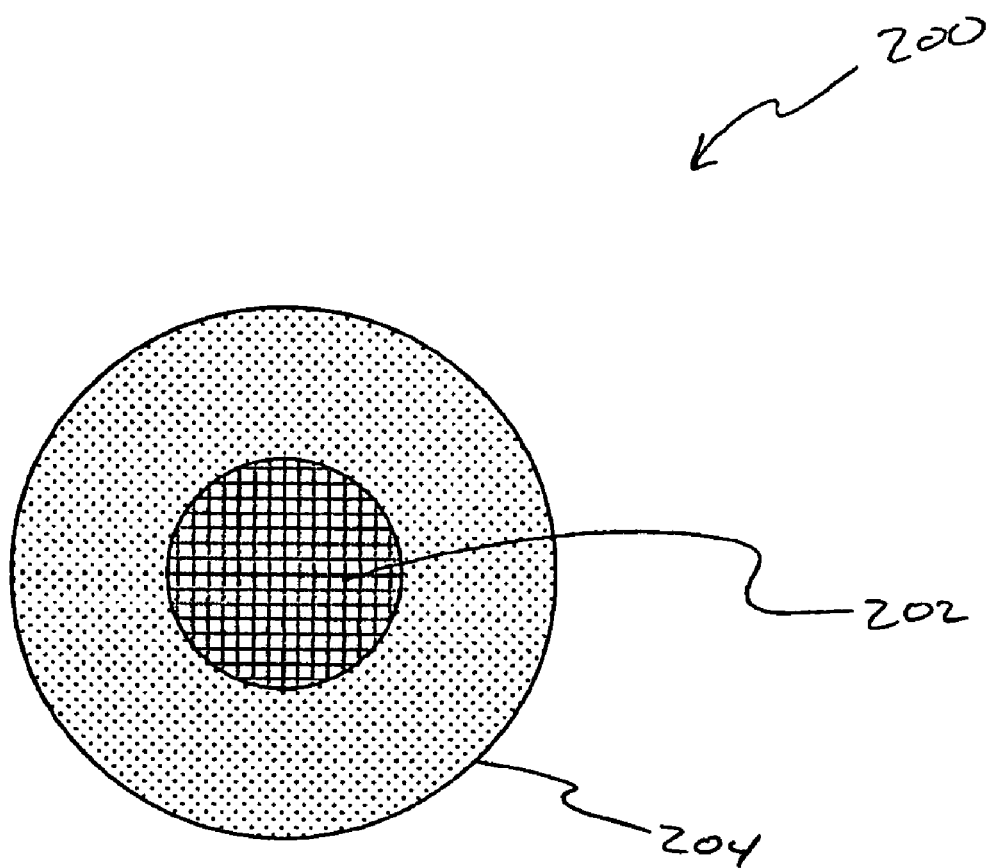
FIG. 2 is an illustration of a cross-section of a metal-coated fiber.

FIG. 1 is a flowchart of an example method 100 of producing an anode according to the present invention. In step 102, micro-denier fibers are coated with a valve metal to produce metal-coated fibers. A cross-section (not to scale) of an example metal-coated fiber 200 is shown in FIG. 2. Metal-coated fiber 200 includes a micro-denier fiber 202 and a metal coating 204 surrounding micro-denier fiber 202. Micro-denier fiber 202 may be made from any fibrous material, including but not limited to carbon, polyester, polyacrylic, poly amide, polypropylene, nylon, or other polymers.

Figure 9:
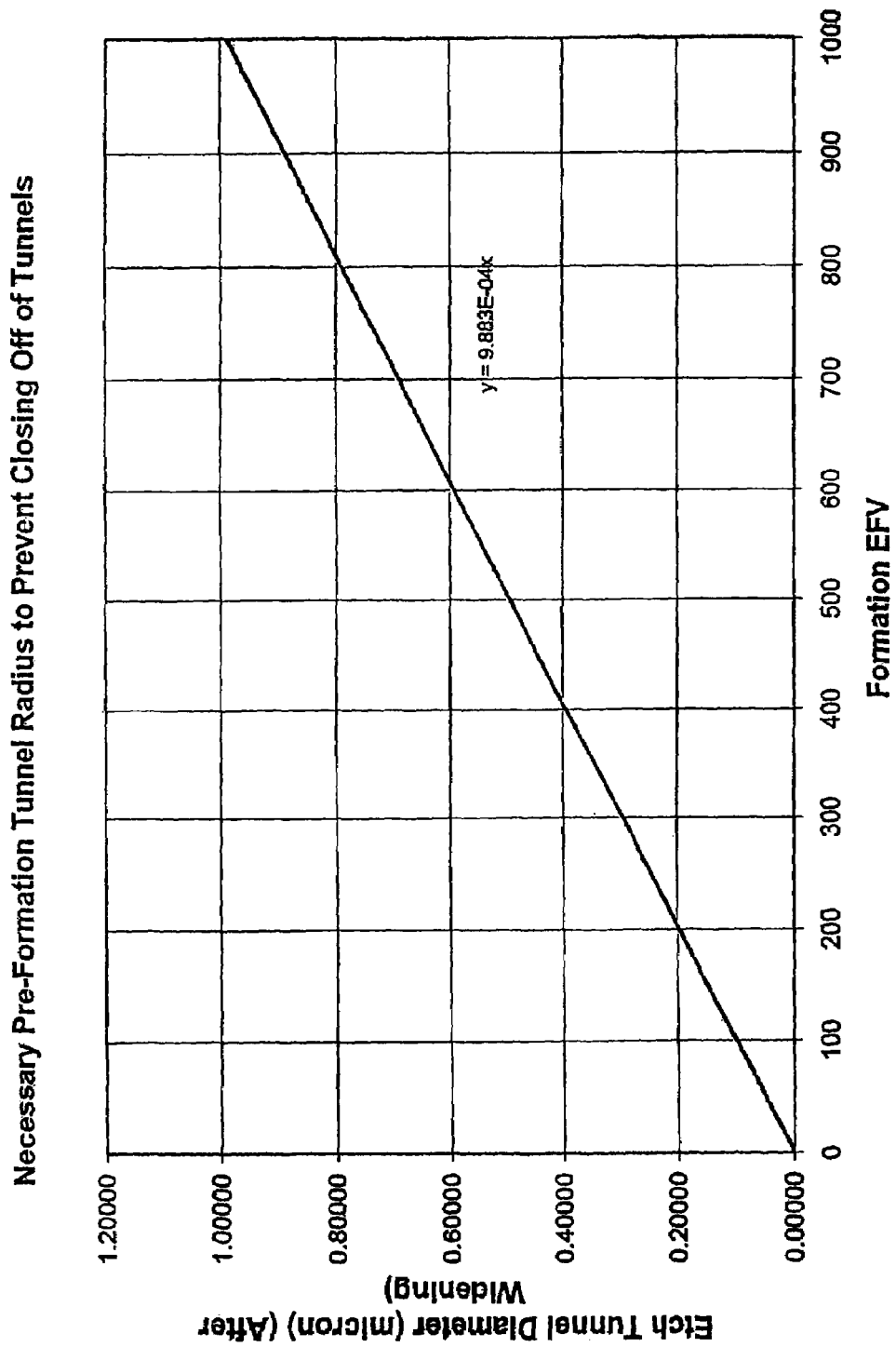
FIG. 9 is a graph showing the necessary pre-formation tunnel radius to prevent closing-off of tunnels during oxidation.

The diameter of micro-denier fiber 202 will depend on a desired tunnel size for the final anode. Because the formation process (described below) adds to the surface of the metal, the tunnel size created by micro-denier fiber 202 should be large enough so that the resulting tunnel will not close off after oxidation. FIG. 9 is a graph showing the minimum tunnel radius necessary to prevent closing off of tunnels as a function of the formation voltage. The desired tunnel size will also depend on the desired capacitance, since capacitance decreases with increased tunnel size. For example, the tunnels, and thus micro-denier fiber 202, may have a diameter of less than 10 µm, preferably in the range of 0.5 µm to 3 µm, and more preferably approximately 1 µm.

Metal coating 204 is formed from a valve metal such as aluminum, titanium, tantalum, or niobium. Valve metals are metals that can form anodic oxides on their surfaces. Metal coating 204 may be applied using various coating techniques known to persons of skill in the relevant art. Example coating techniques are evaporation and sputtering, in which the valve metal is melted into fine particles and misted onto the fiber. Evaporation requires a high vacuum environment, while sputtering requires a low vacuum environment. Although, in the present example, metal coating 204 has a thickness of approximately 0.2 µm to 2.0 µm, the thickness of metal coating 204 will depend on a desired spacing between the tunnels and/or tunnel density.

Figure 10:
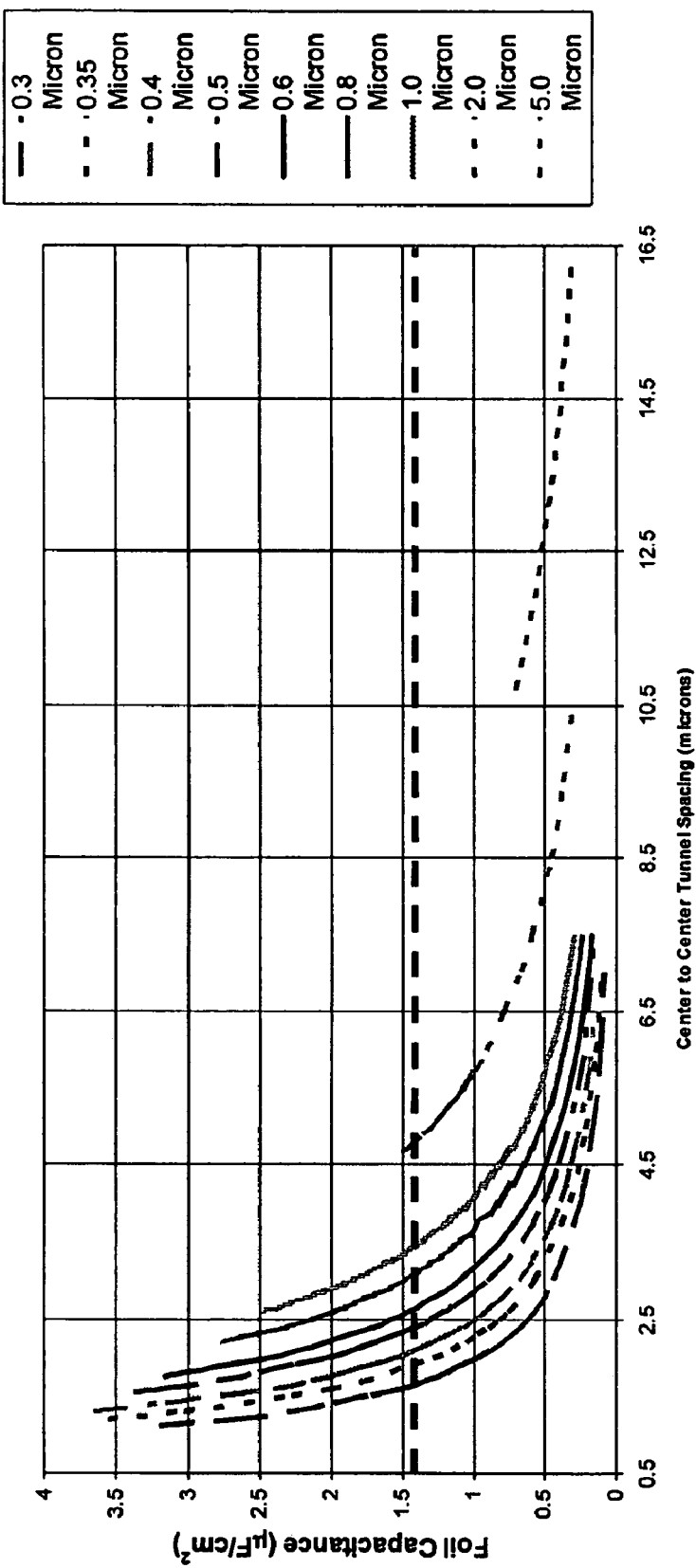
FIG. 10 is a graph showing foil capacitance as a function of tunnel spacing in a hexagonal close-packed array.

For example, a micro-denier fiber having a diameter of 1 µm with a metal coating of approximately 1 µm produces an anode having a tunnel density of approximately 25 million tunnels per $cm^2$ to about 30 million tunnels per $cm^2$ in a close-packed hexagonal array. One of skill in the art will recognize that anodes may be created with different fiber diameters and/or different tunnel densities without departing from the spirit and scope of the present invention. FIG. 10 is a graph showing the results of a theoretical study measuring capacitance versus tunnel spacing in a close-packed hexagonal array for different radii for a 449 Volt EFV (effective formation voltage), wherein the tunnel spacing is measured between the centers of tunnels in a foil. The results for maximum foil capacitance indicate that, at the appropriate tunnel spacing in a hexagonal close-packed array, the foil capacitance can be greatly increased from the 1.4 µF at 449 V EFV currently produced using conventional processes. Theoretically, the capacitor size, therefore, could be significantly reduced and still deliver the same energy, or higher reliability designs could be implemented. Therefore, a tunnel pattern in this configuration could give a significantly improved capacitor.

Alternatively, metal coating 204 may be applied using a chemical vapor deposition technique or a physical vapor deposition technique. In chemical vapor deposition, thermal energy heats the valve metal for decomposition onto the fiber. One type of chemical vapor deposition is plasma enhanced chemical vapor deposition ("PECVD"). PECVD uses thermal energy to generate a plasma from the valve metal, which transforms the metal into a gas mixture. The gas mixture is applied to, for example, micro-denier fiber 202, leaving an approximately uniform film on micro-denier fiber 202. In physical vapor deposition processes, high energy radiation is applied to the valve metal to produce a plasma that coates the fiber atom-by-atom.

In step 104 of method 100, the fibers are arranged to form an array. The arrangement is preferably predetermined and depends on the number of pores per area desired for a particular application. Alternatively, the fibers may be arranged in a non-predetermined pattern. Although the present invention will be described with reference to a hexagonal close-packed array as the arrangement, one of skill in the relevant art(s) will understand that any arrangement, such as any ordered arrangement that maximizes surface area, may be formed without departing from the spirit and scope of the present invention.

Figure 4:
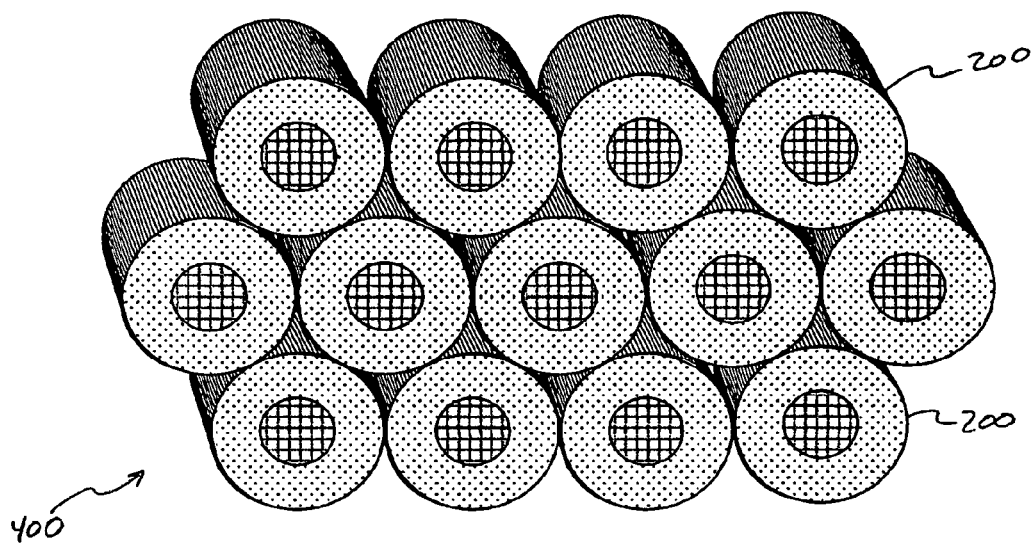
FIG. 4 is an illustration of a plurality of metal-coated fibers arranged in a hexagonal close-packed array.

In one embodiment, metal-coated fibers, such as a plurality of fibers 200, are bundled into an arrangement such as a hexagonal close-packed array. In this example, the arrangement in step 104 would occur after step 102. FIG. 4 is an illustration of a plurality of metal-coated fibers 200 arranged in a hexagonal close-packed array 400.

Figure 3:
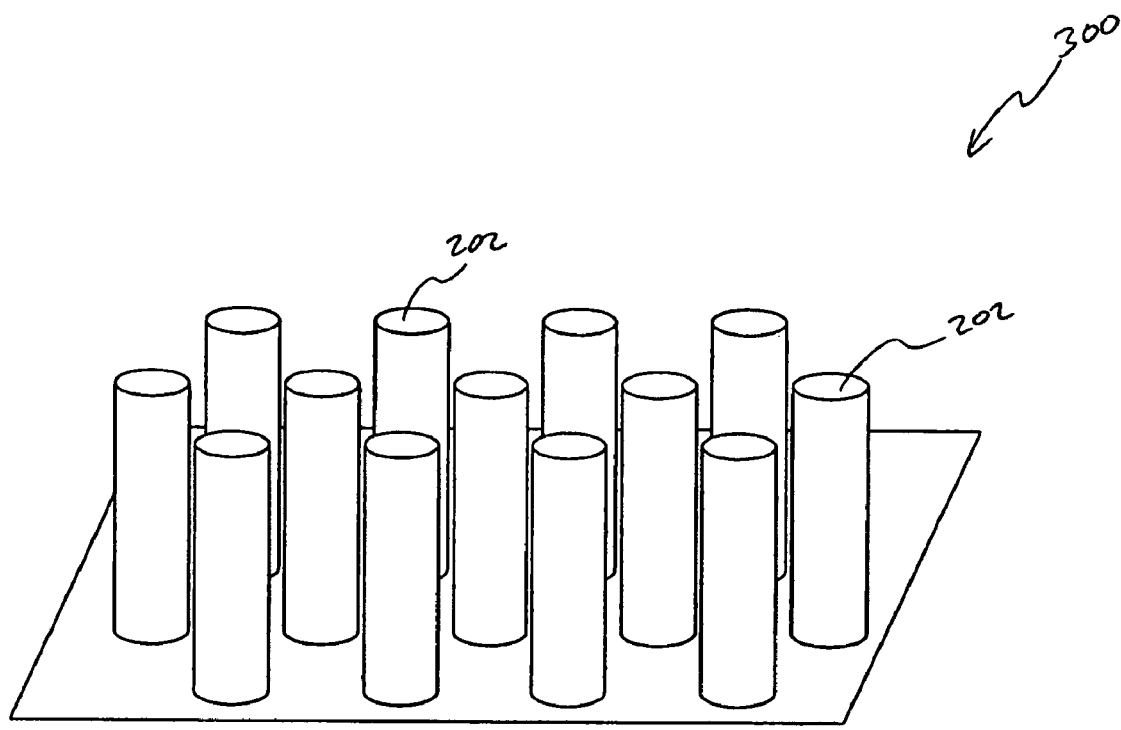
FIG. 3 is an illustration of an array of fibers.

In an alternative embodiment, fibers, such as carbon fibers, are created or "grown" in the hexagonal close-packed array. In this case, step 104 would occur in time prior to step 102. FIG. 3 is an illustration of an example array 300 of fibers 202 arranged in a hexagonal array. Each fiber 202 is approximately parallel to each other fiber 202. Any number of fibers 202 and/or size of fiber array 300 can be created in a predetermined arrangement. Alternatively, some of fibers 202 may be removed from array 300 to create a predetermined pattern. Further, fibers 202 may be created in a non-predetermined pattern. Although fibers 202 are shown as being about the same length, one of skill in the relevant art(s) will recognize that the fibers may be of varying lengths.

In step 106 of method 100, the arrangement of metal-coated fibers is bonded until little or no space is left between any of the metal-coated fibers. In one embodiment, array 400 is compressed, such as with a vise, across its cross-section until metal-coated fibers 200 are cold-welded to each other. In another embodiment, array 400 is heated, and possibly melted, until metal-coated fibers 200 bond to each other.

In step 108 of method 100, the bonded metal-coated fibers are cut into appropriate anode shapes, such as sheets. If the fibers were grown to appropriate lengths before being coated with the valve metal, then step 108 may be skipped. The thickness of the shapes will depend on the desired use. For example, for use as anode foils in an electrolytic capacitor, sheets may be cut at a thickness of approximately 50 µm-1000 µm, a preferred thickness being approximately 110 µm.

In step 110, the fibers are removed from the array to create a highly porous, high surface area anode. This removal may be performed through, for example, sintering. Sintering heats the coated valve metal so that the metal bonds mechanically without melting. Sintering also burns the fiber out of the sheets. Another way to remove the fibers is with a chemical bath. If a chemical bath is used, the fibers should be made of reactive or otherwise decomposable material that will disintegrate when exposed to the chemical bath. Performing step 110 in a vacuum assists in a uniform application and clearing all particles resulting from the removal process.

Once the fibers are removed from the array, creating the porous anode, the anode may be cut, punched, or shaped for use in, for example, an electrolytic capacitor. Example formation procedures and uses are further described below.

Figure 5:
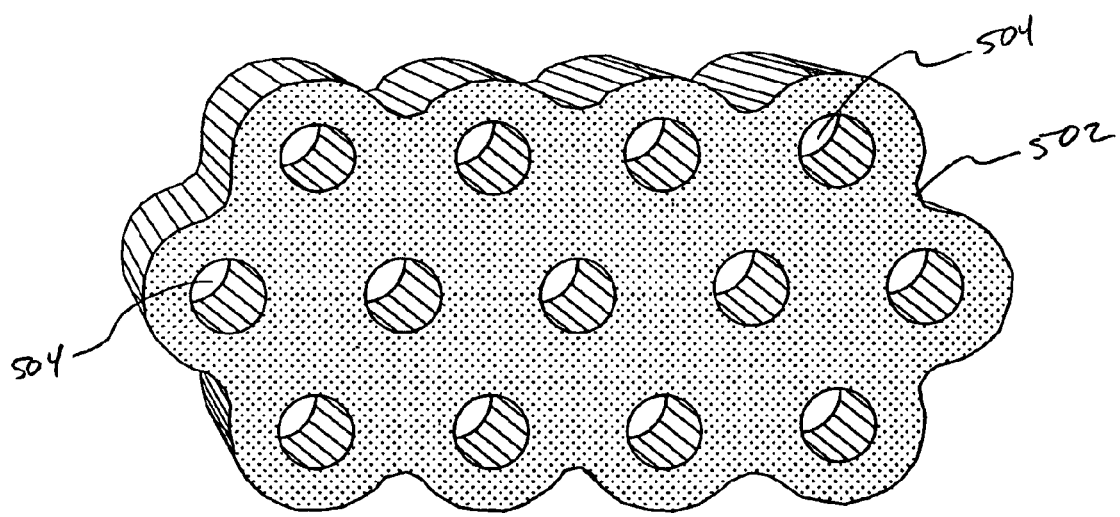
FIG. 5 is an illustration of a porous foil produced according to an embodiment of the present invention.

FIG. 5 is an illustration of an example porous foil 502 produced when the fibers are removed from the hexagonal close-packed arrangement. Because of the original fiber arrangement, tunnels 504 are approximately parallel and extend completely through foil 502. Tunnels 502 have a diameter of less than approximately 10 µm, preferably in the range of about 0.5 µm to about 3 µm, more preferably about 1 µm. The tunnel density depends on the diameter of the tunnels and the spacing between the tunnels. In a preferred embodiment, foil 502 has a tunnel density in the range of 25 million tunnels per $cm^2$ to 30 million tunnels per $cm^2$ or more. Once porous foil 502 has been produced, it can be oxidized to produce an anode foil for, for example, an electrolytic capacitor as described below.

Figure 6:
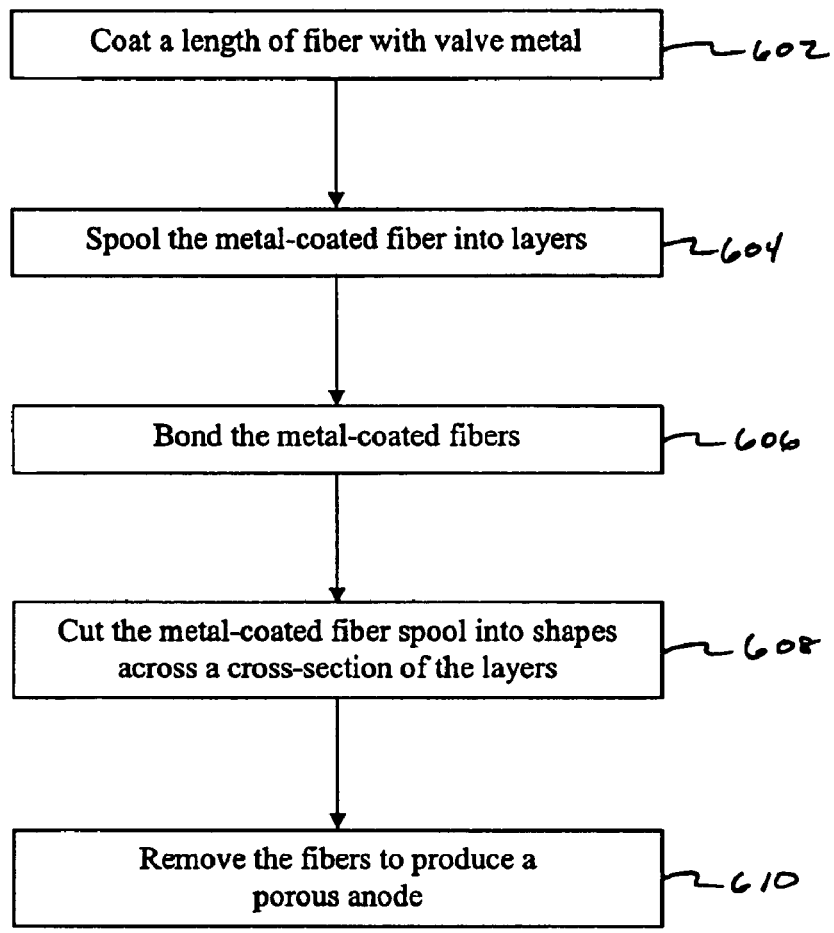
FIG. 6 is a flowchart of a method of producing an anode according to another embodiment of the present invention.

FIG. 6 is a flowchart of an alternative method 600 of producing an anode according to the present invention. In step 602, a length of fiber, such as a monofilament string, is coated with a valve metal as described below. As with method 100, the fiber may be made from, for example and without limitation, an organic and/or synthetic fiber such as carbon, polyester, polyacrylic, poly amide, polypropylene, or nylon. In step 604, the metal-coated fiber is spooled into layers.

Figure 7:
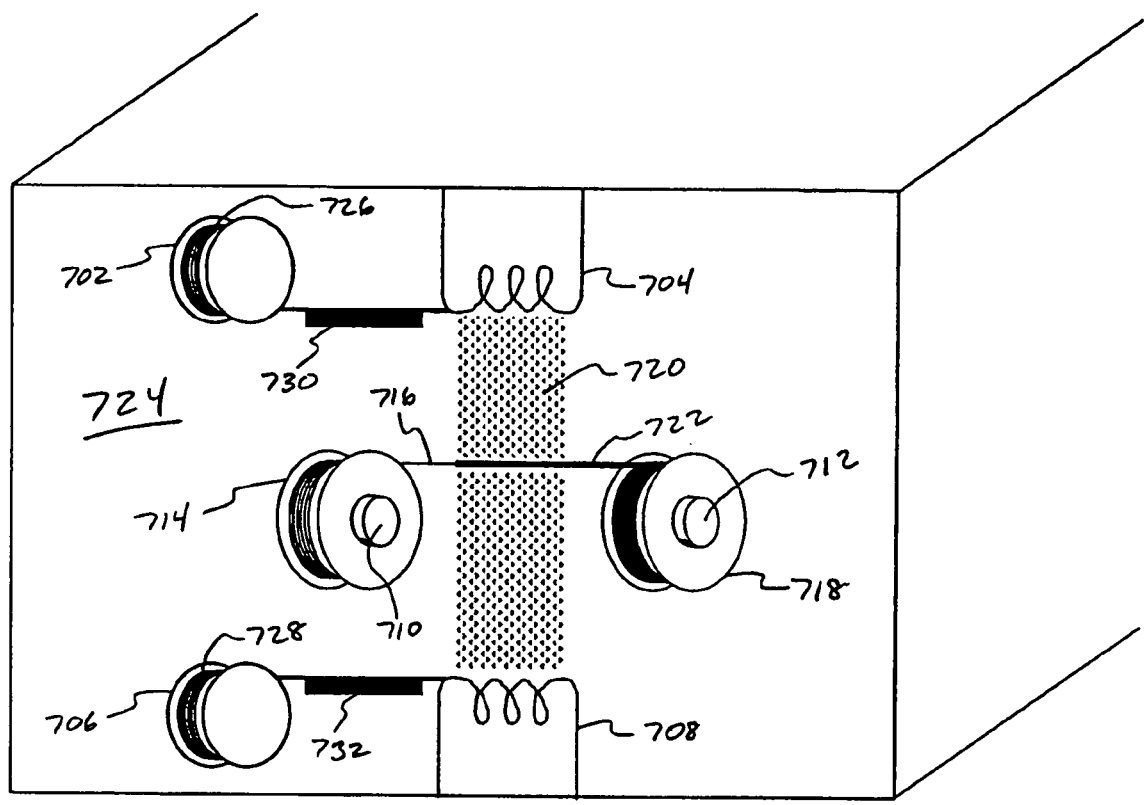
FIG. 7 is an illustration of a coating and spooling system according to an embodiment of the present invention.

FIG. 7 illustrates an example coating and spooling system 700. Coating and spooling system 700 includes a top valve metal spool 702, a top coating apparatus 704, a bottom valve metal spool 706, a bottom coating apparatus 708, filament holder 710, and metal-coated fiber holder 712. A spool 714 of fiber 716 is placed onto filament holder 710. Fiber 716 is then spooled from filament holder 710 to a second spool 718 on metal-coated fiber holder 712.

As fiber 716 is being spooled to second spool 718, top valve metal filament 726 and/or bottom valve metal filament 728 are guided to top coating apparatus 704 and/or bottom coating apparatus 708, respectively. Top valve metal filament 726 may be guided to top coating apparatus 704 by guide member 730. Similarly, bottom valve metal filament 728 may be guided to bottom coating apparatus 708 by guide member 732. Coating apparatuses 704 and 708 coat fiber 716 with the valve metal through, for example and without limitation, evaporation or sputtering. The valve metal hardens on fiber 716 to form a metal-coated fiber 722. Coating system 700 may be enclosed in a vacuum 724 to promote uniform coating and to assist in removal of particles.

For example, thermal evaporation may be used to coat fiber 716 with valve metal from filaments 726 and/or 728. With thermal evaporation, coating apparatuses 704 and 708 are electrical coils that pass an electric current through valve metal filaments 726 and 728, respectively. This evaporates the valve metal, causing it to mist onto fiber 716. Although FIG. 7 is described herein with reference to thermal evaporation, one of skill in the relevant art(s) will recognize that other coating or thin-film application methods may be implemented without departing from the spirit and scope of the present invention. For example and without limitation, electron beam application, sputtering, physical vapor deposition, or chemical vapor deposition techniques may be used to coat fiber 716. In these alternative cases, coating apparatuses 704 and 708 may be devices other than electrical coils.

Figure 8:
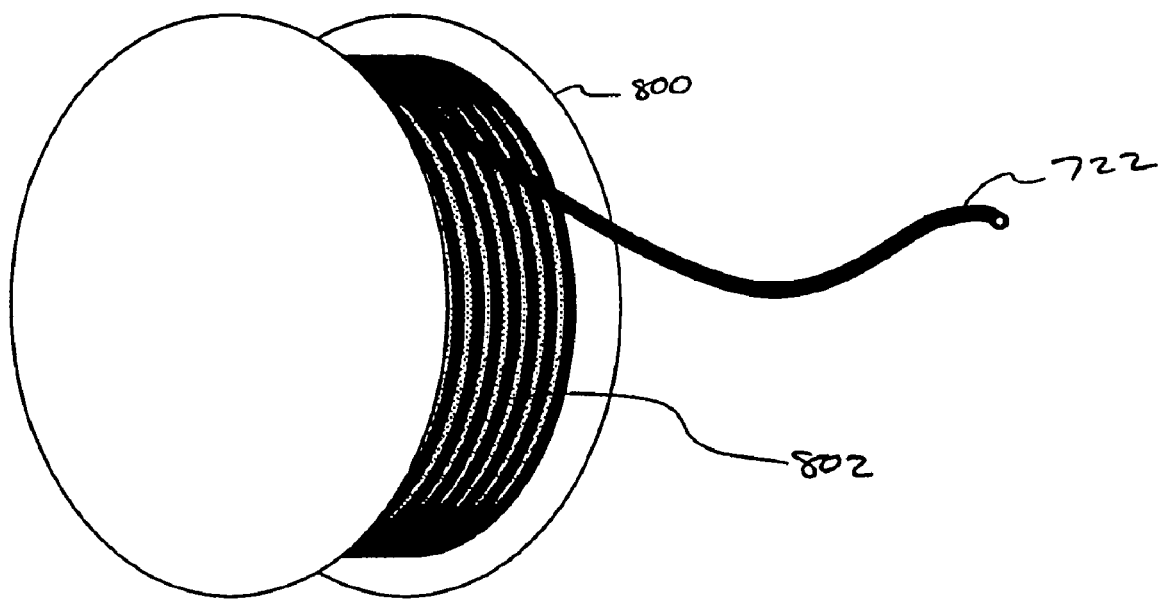
FIG. 8 is an illustration of a spool having layers of metal-coated fiber.

When metal-coated fiber 722 is spooled during step 604, it may be spooled into layers. FIG. 8 is an illustration of a spool 800 of metal-coated fiber 722 having layers 802. Metal-coated fiber 722 may be spooled into a predetermined arrangement, such as a hexagonal close-packed arrangement. Alternatively, metal-coated fiber 722 may be spooled without consideration of a particular arrangement. If spooled into a hexagonal close-packed arrangement, then a cross-section of layers 802 of metal-coated fiber 722 is similar to that shown in FIG. 4.

In step 606, the layers 802 of metal-coated fiber 722 are bonded. Similarly to step 106 of method 100, bonding may occur through, for example, compression or heating.

In step 608, layers 802 of metal-coated fiber 722 are cut into shapes across a cross-section of layers 802 by, for example, a laser. Step 608 may occur before or after step 606. For example, layers 802 may be cut into sheets, with each sheet then bonded individually. The thickness of the shapes will depend on the desired use. For example, for use as anode foils in an electrolytic capacitor, the sheets may be cut at a thickness of approximately 50 µm-1000 µm, preferably approximately 110 µm.

In step 610, the fibers are removed to produce a porous metal anode, such as foil 502 in FIG. 5. Step 610 may be performed similarly to step 110 of method 100, such as by sintering. As previously described, once foil 502 is created, sections of foil 502 may be cut, punched, or shaped for use in, for example, an electrolytic capacitor.

Anodes such as foil 502, created by either method 100 or method 600, have approximately parallel tunnels that extend completely through the anode. The ability to create small tunnels that extend all the way through the anode greatly increases the available surface area compared to traditional etching methods. Providing parallel tunnels also increases the surface area of the anode, since the likelihood of intersecting tunnels is decreased.

For use in an electrolytic capacitor, for example, the anode of the present invention may be prepared for use as a capacitor. In an example formation process, after the anode is created, as described above, it is dipped into a deionized water bath at a temperature of 80° C. to 100° C., preferably 95° C., to form a hydrate layer on the anode surface.

Next, a barrier oxide layer is electrochemically formed onto one or both surfaces of the metal anode, sufficiently thick to support the intended use voltage, by placing the anode into a forming solution, including but not restricted to a solution based on azelaic acid, sebacic acid, suberic acid, adipic acid, dodecanedioic acid, citric acid or other related organic acids and salts, preferably a citric acid solution at a temperature of 80° C. to 100° C., preferably 85° C., at a current density of 1 mA/cm$^2$ to 40 mA/cm$^2$, preferably 16 mA/cm$^2$. A formation voltage of 50 V to 800 V, preferably 445 V, can be applied to the anode to form the barrier oxide layer. The barrier oxide layer provides a high resistance to current passing between the electrolyte and the metal anode, also referred to as the leakage current. A high leakage current can result in the poor performance and reliability of an electrolytic capacitor. In particular, a high leakage current results in greater amount of charge leaking out of the capacitor once it has been charged.

A heat treatment of 500° C.±20° C. may be applied to the anode following formation for 1 to 10 minutes, preferably 4 minutes. The anode is then returned to the forming solution and allowed to soak with no applied potential for 1 to 10 minutes, preferably 2 minutes. A second formation in the same electrolytic forming solution at high temperature is performed at a potential of 435 V.

Next, the anode is dipped in a suitable low concentration oxide-dissolving acid solution including but not restricted to phosphoric acid, formic acid, acetic acid, citric acid, oxalic acid, and acids of the halides, preferably phosphoric acid, at a concentration of 1% to 10%, preferably a concentration of 2%, at a temperature of 60° C. to 90° C., preferably 70° C., for a time of 1 to 10 minutes, preferably 4 minutes.

Finally, the anode is reformed at a voltage of 50 V to 800 V, preferably 445 V, in a suitable forming solution, as discussed above, at a high temperature, preferably 80° C. to 100° C., more preferably 85° C.

Anodes created according to the present invention will have enhanced capacitance as a result of the high surface area. Anodes that are processed according to the present invention can be utilized for a variety of applications that require a high capacitance anode. For example, as discussed above, high capacitance anodes are widely utilized in electrolytic capacitors. Electrolytic capacitors which are manufactured with anodes created according to the present invention can obtain a given capacity with a smaller volume than currently available electrolytic capacitors and, therefore, can be very compact in size. The final shape of the anodes can be any of a number of geometries, including but not limited to a foil, slug, or cylinder. For example, the anode may be formed into a porous slug having the desired dimensions of the finished capacitor.

Electrolytic capacitors manufactured with anodes created according to the present invention can be utilized in ICDs, such as those described in U.S. Pat. No. 5,522,851 to Fayram, incorporated by reference herein in its entirety, such that the increased capacitance per unit volume of the electrolytic capacitor allows for a reduction in the size of the ICD.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of producing an anode for use in an electrolytic capacitor, comprising the steps of:
   (a) coating a plurality of micro-denier fibers with aluminum to produce a plurality of metal-coated fibers;
   (b) bonding said plurality of metal-coated fibers to each other to form a bonded array;
   (c) removing said fibers to form tunnels in the remaining aluminum; and
   (d) electrochemically forming a barrier oxide layer on at least one surface of the remaining aluminum.

2. The method of claim 1, further comprising:
   arranging said plurality of metal-coated fibers in a hexagonal close-packed array.

3. The method of claim 1, further comprising:
   arranging said plurality of fibers in a hexagonal close-packed array prior to said coating step.

4. The method of claim 1, further comprising:
   cutting said bonded array into foil sheets.

5. The method of claim 4, wherein said foil sheets have a thickness of less than or equal to about 110 microns.

6. The method of claim 1, wherein said tunnels are uniformly sized.

7. The method of claim 6, wherein said tunnels are parallel.

8. The method of claim 6, wherein each of said tunnels has a diameter of less than about 10 μm.

9. The method of claim 8, wherein each of said uniformly sized tunnels has a diameter in the range of about 0.5 μm to about 3 μm.

10. The method of claim 9, wherein each of said uniformly sized tunnels has a diameter of about 1 μm.

11. The method of claim 6, wherein said uniformly sized tunnels are arranged in a hexagonal close-packed array.

12. The method of claim 6, wherein said anode has a tunnel density in the range of about 25 million tunnels per cm$^2$ to about 30 million tunnels per cm$^2$.

13. The method of claim 1, wherein said micro-denier fibers comprise micro-denier polymer fibers.

14. The method of claim 1, wherein said step (b) comprises compressing said plurality of metal-coated fibers to form a bonded array.

15. The method of claim 1, wherein said step (b) comprises heating said plurality of metal-coated fibers to form a bonded array.

16. A method of producing an anode for use in an electrolytic capacitor, comprising the steps of:
   (a) coating a length of fiber with aluminum to produce a length of metal-coated fiber;
   (b) arranging said length of metal-coated fiber into a plurality of layers;
   (c) removing said fiber to form tunnels in the remaining aluminum; and
   (d) electrochemically forming a barrier oxide layer on at least one surface of the remaining aluminum.

17. The method of claim 16, further comprising:
following step (b), bonding said layers.

18. The method of claim 16, wherein said step (b) comprises:
   (i) spooling said length of metal-coated fiber into layers, wherein a cross-section of said layers includes said fiber arranged in a predetermined arrangement; and
   (ii) cutting said layers across said cross-section to produce an anode.

19. The method of claim 18, wherein said predetermined arrangement is a hexagonal close-packed array.

20. The method of claim 16, wherein said tunnels are uniformly sized.

21. The method of claim 20, wherein each of said uniformly sized tunnels has a diameter of less than approximately 10 μm.

22. The method of claim 17, wherein said uniformly sized tunnels have a diameter in the range of approximately 0.5 μm to 3 μm.

23. The method of claim 22, wherein each of said uniformly sized tunnels have a diameter of approximately 1 μm.

24. The method of claim 21, wherein said anode has a tunnel density in the range of 25 million tunnels per cm$^2$ to 30 million tunnels per cm$^2$.

25. The method of claim 20, wherein said uniformly sized tunnels are parallel.

* * * * *